Dec. 20, 1955    G. W. DUNHAM    2,727,265
LAWN, GROUND AND WALK SWEEPER
Filed May 24, 1952    3 Sheets-Sheet 3
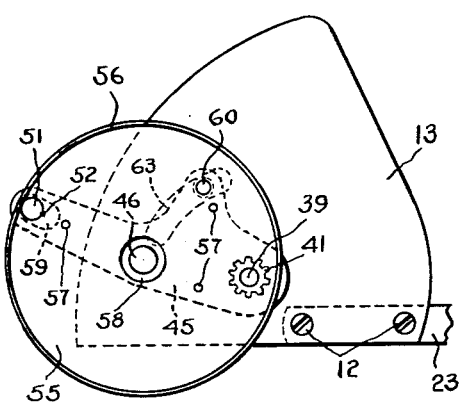
_Fig. 4._
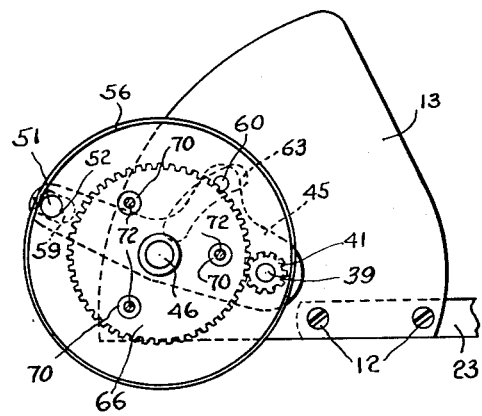
_Fig. 5._
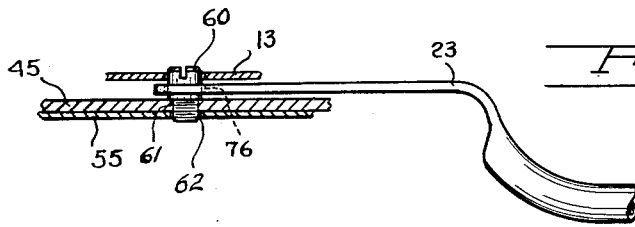
_Fig. 6._
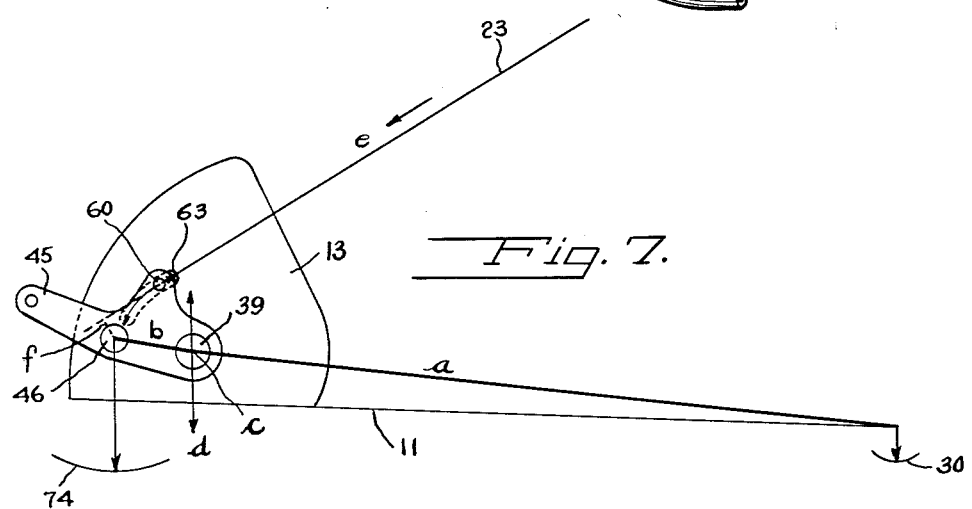
_Fig. 7._
*INVENTOR.*
GEORGE W. DUNHAM
BY Chapin & Neal
*ATTORNEY.*

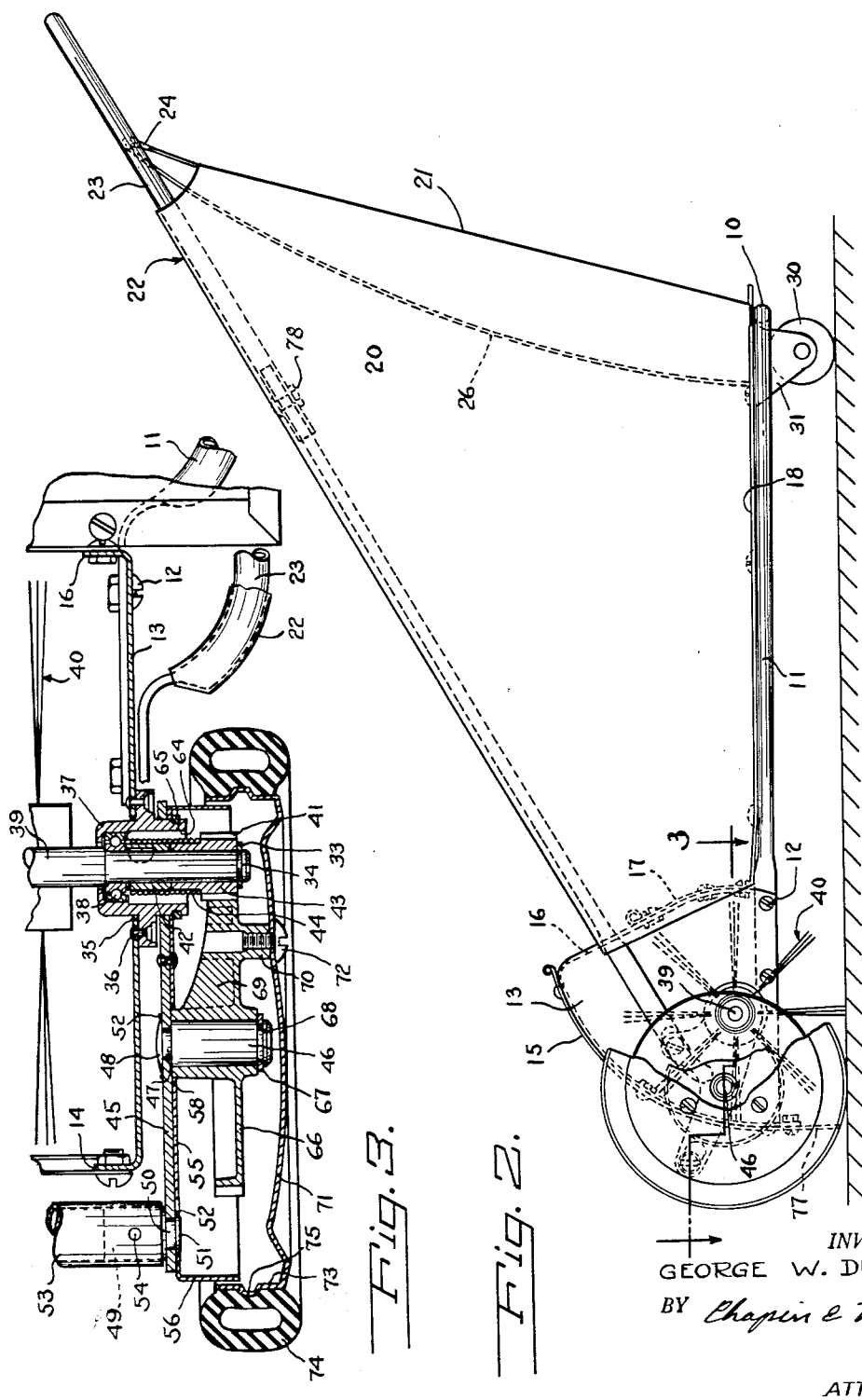

United States Patent Office 2,727,265
Patented Dec. 20, 1955

2,727,265

LAWN, GROUND AND WALK SWEEPER

George W. Dunham, Westport, Conn., assignor to Savage Arms Corporation, Utica, N. Y., a corporation of Delaware Application May 24, 1952, Serial No. 289,733

6 Claims. (Cl. 15—79)

This invention relates to an improvement in sweepers.

The principal object of the invention is to provide a sweeper construction which will efficiently sweep leaves, grass cuttings and other small debris from lawns, concrete or brick walks and other ground surfaces.

A further object is to provide a construction which automatically adjusts itself to varying sweeping conditions to give the most efficient operation with respect to the character of the surface being operated on and the character of the material to be removed therefrom.

Other and further objects relating to the details of construction and mode of operation under special circumstances will be made apparent in the following specification and claims, and in the disclosure of the drawings.

In the drawings,

Fig. 2 is a side elevational view of the structure shown in Fig. 1, parts being broken away;

Fig. 3 is a detail sectional view substantially on line 3—3 of Fig. 2 but on a larger scale;

Fig. 4 is a detail side view with the wheel and driving gear removed;

Fig. 5 is a view similar to Fig. 4 but with the driving gear in place;

Fig. 6 is a detail view of the handle mounting; and

Fig. 7 is a diagrammatic view showing the mode of operation of the device.

Figure 1:
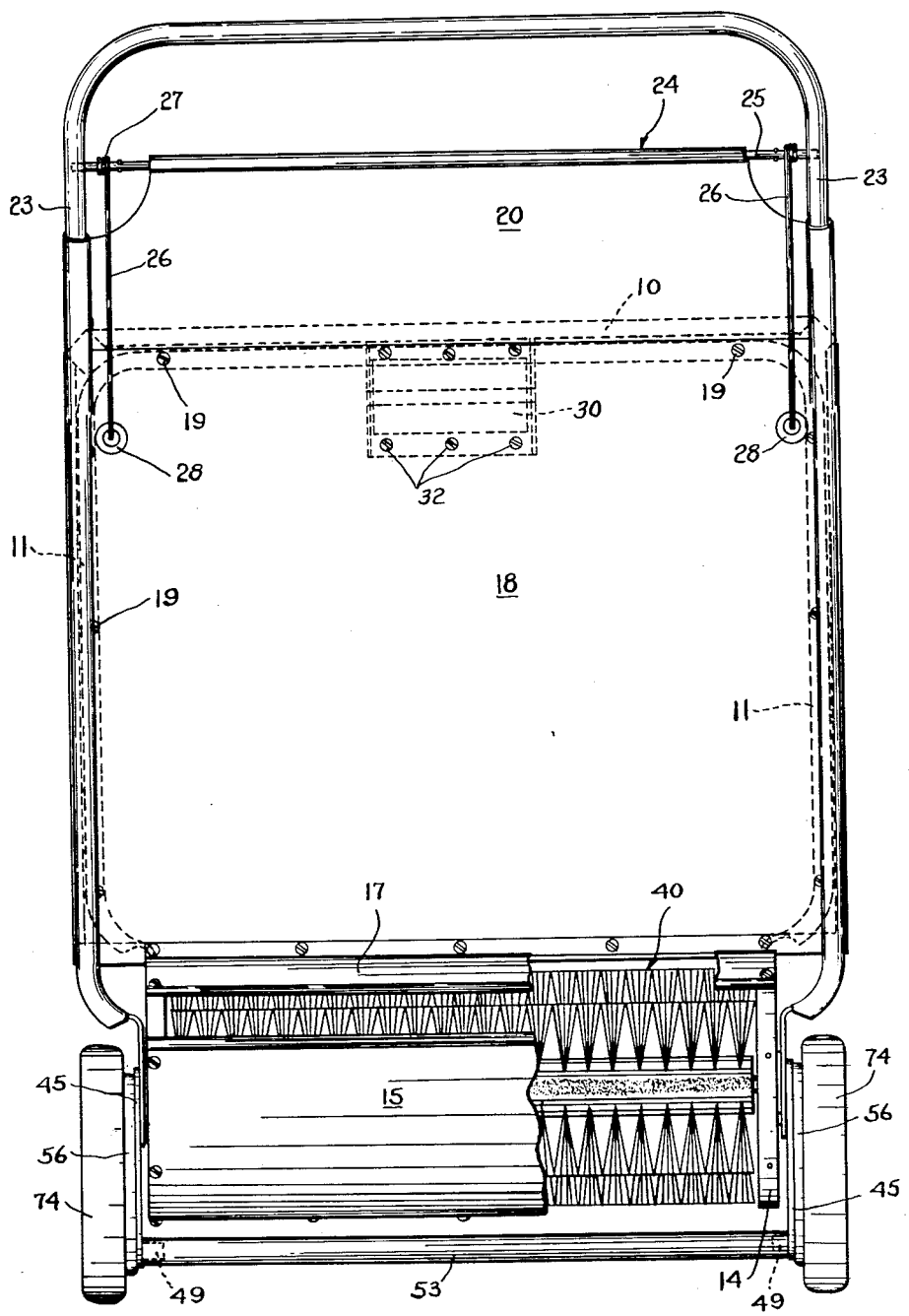
Fig. 1 is a plan view of a sweeper embodying the invention.

Referring to the drawings, the main frame of the sweeper is shown as comprising a U-shaped member having a rear cross portion 10 and forwardly extending side members 11. The side members 11 are connected at their forward ends, as by through bolts 12, to vertical side members 13. The side members 13 are generally triangular in shape having upwardly and rearwardly extending arcuate forward edges which are formed with inwardly extending flanges 14 to which are bolted, or otherwise secured, an arcuate cover plate 15 which, with the side plates 13 form a rearwardly opening hood. The rear edges of side members 13 are provided with inwardly extending flanges 16 to the lower portions of which are bolted, or otherwise secured, a cross piece 17 which restricts the rearward opening of the hood.

The rear portion of the U-member 10—11 carries a hopper, the floor of which comprises a plate 18 secured, as by self tapping screws 19 to the U-member, the side and rear edges of plate 18 being bent inwardly upon the plate to clamp the lower edge portions of hopper side walls 20 and end wall 21 between said inwardly bent edges and the plate. The side walls 20 and rear wall 21 are preferably formed of canvas, or similar material and the upper edges of walls 20 are provided with loop hems 22 through which the side members 23 of a propelling handle, later described, extend. The upper edge of rear wall 21 is formed with a loop hem 24 through which a cross member 25 extends, the ends of member 25 being fixed to the side members 23. The adjacent edges of the side and rear walls may be stitched or otherwise secured together. The walls of the hopper are normally held in upwardly extending position by spring rods 26 having their upper ends pivotally connected at 27 to cross member 25, the lower free ends of rods 26 being releasably engaged in seats 28 carried by the floor of the hopper. The rods 26 in addition to holding the hopper walls in position also resiliently support the propulsion handle in the upwardly inclined position of Fig. 2.

The rear end of the hopper is shown supported by a centrally positioned short roller 30 rotatably mounted in a suitable bracket 31 fixed to cross member 10 and the floor 18 of the hopper by bolts 32.

As will be apparent, frame members 10, 11, the hood members 13, 15, and 17 with floor member 18 form a substantially rigid frame structure.

The side members 13 of the hood are formed with aligned openings 35 in which are secured, as by rivets 36, bearing supports or housings 37. At the inner ends of supports 37 are mounted ball bearings 38 in which the ends of a brush shaft 39 are journaled. The brush, generally indicated at 40, is of generally cylindrical form and may be constructed and fixed to shaft 39 in any suitable manner.

The ends of the shaft 39 extend outwardly of the housing and pinions 41 are rotatably mounted thereon and held in place by clip rings 33 seating in grooves 34 formed on the end of the shaft. The pinions 41 are adapted to be connected to shaft 39 to drive the latter in a clockwise direction, as viewed in Fig. 1, by suitable one-way clutches. Preferably and as shown in Fig. 3 these clutches each comprise a collar 42 which is keyed to the shaft 39, the outer surface of collar 42 forming a continuous cylindrical surface with a hub 43 extending from pinion 41. A coiled spring 44 fits snugly over the collar 42 and hub 43, the spring being coiled in the direction to tighten and connect the hub and collar in driving relation when the pinion is driven in a clockwise direction as viewed in Fig. 1, the spring loosening to release the pinion from the collar when the pinion rotates in the opposite direction.

Pivotally mounted on the bearing housings 37, outwardly of side members 13, are wheel carrying members 45. Each member 45 carries an outwardly extending stub shaft 46, which as shown have a reduced portion 47 which extends through an opening in the member 45, the end of portion 47 being headed over, rivet fashion, as indicated at 48, to fix the stud shaft to the members 45.

Each member 45 carries an inwardly extending stud 49 having a reduced portion 50 extending through an opening in the member 45, the end of the reduced portion 50 being headed over, rivet fashion, as shown at 51 to fix the stud member 45. As indicated at 52 the edges of heads 48 and 51 may be spot welded to member 45 at one or more places to assure against rotation of the stub shaft 46 and stud 48, relative to member 45, and to render the connection rigid.

A tubular member 53 has its ends telescoped over the opposed studs 48, the ends of member 53 being pinned to the studs at 54. The members 45 are thus constrained to swing together about the bearing housings and the stub shafts 46 are maintained in alignment.

A housing member 55 having an annular flange 56 is riveted to each member 45 at 57 (Figs. 3 and 4). The members 55 are each provided with an opening 58 through which stub shaft 46 extends and an opening 59 to accommodate the rivet head 51 of stud 49, the latter opening being elongated to provide room for the spot welds 52.

The pivotal movement of the wheel carrying members 45 is limited by studs 60 threaded at 61 into the members 45, the housing members 55 being apertured at 62 to accommodate the threaded end of the studs. The studs extend through arcuate opening 63 in side members 13, the engagement of the studs 60 with the ends of openings 63 defining the limits of pivotal movement of members 45 about the bearing housings 37. The outer ends of housings 37 are provided with annular grooves 64 receiving spring rings 65 to hold the members 45 in pivotal relation on the housings 37.

Mounted for free rotation on each stud shaft 46 is a driving gear 66 meshing with the adjacent pinion 41. The opening 58 in housing 55 is of a diameter to receive the hub of gear 66. The gears 66 are held on the stub shafts 46 by snap rings 67 seating in grooves 68 on the end of shafts 46.

The webs 69 of the gears 66 are formed with bosses 70, and disc wheels 71 are secured to the gears 66 by machine screws 72 threaded in the bosses 70. The wheels 71 are formed with flanges 73 upon which rubber tires 74 are mounted and held in place by ribs 75 formed in the flanges 73.

As best shown in Figs. 2 and 6, the forward ends of the side members 23 of the propelling handle are pivotally mounted, by means of apertures 76, on the studs 60 between the side 13 of the hood and the members 45.

As will be apparent the sensitivity of the adjusting action may be nicely controlled through variations in the weight of the parts, and in the dimensions of the leverages involved.

Preferably and as shown the forward edge of the front cover plate 15 is provided with the usual flexible curtain 77. Since the plate 15 rises when the brush rises, the opening beneath the curtain 77 increases when an increase in such opening is desirable because of the sweeping conditions at the brush.

Preferably also and as shown, the handle side members 23 are made in sections releasably connected together in any suitable manner as by bolts 78.

As will be apparent from Fig. 2 and the diagram of Fig. 7, the frame 11 in effect forms a long lever $a$ pivoting downwardly about the shaft of roller 30 and members 45 in effect form a short lever $b$ pivoting downwardly about the shaft 46 of wheels 74, the levers $a$ and $b$ being pivoted together about the axis of shaft 39 of the brush as at $c$.

The major portion of the weight of all parts of the device with the exception of the wheels and the parts directly supported thereby are carried to the pivot $c$ and tend to force the brush toward the surface to be swept until the stop member 60 engages the upper end of slot 63 or until the weight is supported by the brush. In general when the device is at rest the latter condition prevails, that is the brush supports the weight with the pin 60 short of the upper end of the slot 63. This accommodates wear of the brush, but if the brush bristles are highly flexible the slot 63 will be dimensioned so that pin 60 will engage the end of slot 63 when the brush bristles have been flexed to the degree to establish the desired form of initial contact of the brush with the sweeping surface.

The pin 60 to which the propelling handle is attached is positioned above the shaft 46 so as to provide a predetermined lever arm $f$ so that a propelling force applied to handle 23 tends to rock member 45 about the axis of shafts 46 thus opposing the load on pivot $c$ and tending to raise the brush. Any obstruction or obstacle in the path of the wheel or brush tending to oppose the forward movement of the sweeper renders the brush lifting force applied to the handles more effective. Thus when the sweeper is operated on a relatively smooth surface such as a pavement the brush hugs the paved surface assuring a clean sweeping action, and when propelled through thick grass the brush rises to comb and sweep leaves and other loose material from the surface and from between the blades of grass. The thicker or taller the grass the greater is the resistance to forward motion of the sweeper and the greater is the lift on the brush. The brush automatically adjusts itself to the work it is required to do and experience has shown that a sweeper embodying the invention, when propelled over a lawn surface and across a concrete walk and again onto the lawn surface, will sweep a clean path both on the lawn and walk surfaces with a constant efficiency. Similarly it automatically adjusts to thick and thin grass areas and other changes in condition of the surface being swept. Not only is the sweeping efficiency improved and rendered uniform but the life of the brush is increased.

What is claimed is:

1. In a sweeper for lawns, sidewalks and the like of the type having a litter receiving hopper, a pair of frames having adjacent ends, a shaft pivotally connecting the adjacent ends of said frames, a pair of ground engaging wheels carried by one of said frames for rotation about an axis spaced from the axis of said shaft, ground engaging supporting means carried at the free end of the other frame, the said litter hopper of the sweeper being carried by the latter frame, a brush carried by said shaft and biased downwardly by the load imposed on said shaft by said frames and the parts carried thereby, means to drive said shaft from said wheels and a propelling handle pivoted to the wheel carrying frame on an axis offset from the axis of said wheels to impart a predetermined lifting force on said shaft in opposition to the load imposed thereon by said frames and the parts carried thereby when a propelling force is applied to the handle.

2. In a sweeper for lawns, sidewalks and the like of the type having a litter receiving hopper, a pair of opposed U frames, a shaft pivotally connecting the adjacent free ends of the arms of said frames, a pair of ground engaging wheels carried by one of said frames for rotation about an axis spaced from the axis of said shaft, ground engaging supporting means carried at the free end of the other frame, the said litter hopper of the sweeper being carried by the latter frame, a brush carried by said shaft and biased downwardly by the load imposed on said shaft by said frames and the parts carried thereby, means to drive said shaft from said wheels and a propelling handle pivoted to the wheel carrying frame on an axis offset from the axis of said wheels to impart a predetermined lifting force on said shaft in opposition to the load imposed thereon by said frames and the parts carried thereby when a propelling force is applied to the handle.

3. A sweeper for lawns, sidewalks and the like which comprises a frame, a hood including spaced side members carried by the forward end portion of the frame, aligned bearing housings secured in said members, bearings in said housings, a shaft rotatably mounted in said bearings, the ends of said shaft extending outwardly of said housings, a brush fixed to said shaft for rotation within said hood, a pair of wheel carrying members pivoted one on each of said bearing housings outwardly of said side members, a cross member connecting said wheel carrying members outwardly of said hood, aligned, outwardly extending stub shafts carried one by each of said wheel carrying members, the axis of said stub shafts being spaced forwardly from said brush shaft, ground engaging wheels rotatably mounted on said stub shafts and a propelling handle having side arms pivoted to the wheel carrying members on an axis offset from the axes of said wheels and shaft to impart a predetermined lifting force on said shaft when a propelling force is applied to the handle.

4. In a sweeper for lawns, sidewalks and the like of the type having a litter receiving hopper, a frame, the said litter hopper of the sweeper being supported by the rear portion of said frame, a shaft journaled in the forward end portion of said frame, a brush mounted on said shaft and biased downwardly by the load imposed on said shaft by said frame and the parts carried thereby, a pair of wheel carrying members pivoted to the frame one at each end of said shaft for limited pivotal movement about the axis of the shaft, a pair of wheels mounted one on each of said wheel carrying members for coaxial rotation about an axis parallel to and spaced from the axis of said shaft, means to drive said shaft from said wheels, and a propelling handle having side arms pivotally connected to said wheel carrying members on an axis offset from the axes of the wheels in a direction to impart a lifting force on said shaft in opposition to the load imposed thereon by said frame and the parts carried thereby when a propelling force is applied to said handles.

5. In a sweeper for lawns, sidewalks and the like of the type having a litter receiving hopper, a frame, the said litter hopper of the sweeper being supported by the rear portion of said frame, a rearwardly and downwardly opening hood fixed to the forward end portion of said frame, said hood including side members, aligned bearings fixed in said side members, a shaft journaled in said bearings and having its ends extending outwardly thereof, a brush fixed to the shaft for rotation within the hood, a pair of wheel carrying members pivoted on said bearings, a cross member connecting the free ends of said arms forwardly of the hood, aligned stub shafts secured one to each of said wheel carrying members intermediate said shaft and said cross member, a pair of gears rotatably mounted one on each of said stub shafts, a pair of pinions rotatably mounted one on each end of said shaft and meshing with the adjacent gear, a pair of ground engaging wheels fixed one to each of said gears, one-way clutches connecting said pinions to said shaft upon forward movement of the wheels, arcuate slots formed in said hood side members concentric with said bearings, stop members fixed to said wheel carrying members and extending inwardly through said slots to limit the pivotal movement of said wheel carrying members, and a propelling handle having side arms pivotally connected to said stop members, said stop members being offset from the axis of said wheels in a direction to impart a lifting force on said shaft when a propelling force is applied to said handles.

6. In a sweeper for lawns, sidewalks and the like of the type having a litter receiving hopper, a frame, side members rigidly connected to the forward end of said frame, a shaft rotatably mounted in said side members, a brush carried by said shaft, ground engaging means for supporting the rear end of said frame, the said litter hopper of the sweeper being supported by said frame intermediate the ends thereof whereby a portion of the weight of the frame and hopper is imposed on the brush, a pair of wheel carrying members pivotally connected one to each of said side members for pivotal movement about the axis of said brush shaft, a pair of ground engaging wheels rotatably mounted one on each of said wheel carrying members for rotation about an axis offset from and parallel to the axis of the brush shaft, means for driving the brush from said wheels, a generally U-shaped propelling handle, the side members of said handle being pivotally connected one to each of said wheel carrying members on an axis offset from the axis of said wheels to impart a predetermined lifting force on the brush shaft in opposition to the load imposed thereon by said frame and the hopper carried thereby when a propelling force is applied to the handle, and means to limit the pivotal movement of said brush carrying members.

References Cited in the file of this patent
UNITED STATES PATENTS

| | | |
|---|---|---|
| 447,381 | Thompson et al. | Mar. 3, 1891 |
| 481,269 | Thompson | Aug. 23, 1892 |
| 666,689 | Phillips | Jan. 29, 1901 |
| 996,108 | Meyer | June 27, 1911 |